United States Patent [19]
Trevino et al.

[11] Patent Number: 6,105,840
[45] Date of Patent: Aug. 22, 2000

[54] SIDE-LOADING AND DISCHARGING RACK FOR VEHICLES

[76] Inventors: Mikyo Trevino, 877 Harbor Hill Dr., Safety Harbor, Fla. 34695-4130; Ernesto Trevino, 6290 Blythefield, Rockford, Mich. 49341

[21] Appl. No.: 09/170,602

[22] Filed: Oct. 13, 1998

[51] Int. Cl.[7] .................................................. B60R 9/00
[52] U.S. Cl. ........................ 224/310; 224/309; 224/315; 224/317; 224/322
[58] Field of Search .................................. 224/310, 309, 224/314, 315, 317, 322; 414/462

[56] References Cited

U.S. PATENT DOCUMENTS

| | | | |
|---|---|---|---|
| 3,193,124 | 7/1965 | Essling | 224/310 |
| 5,782,391 | 7/1998 | Cretcher | 224/310 |
| 5,884,824 | 3/1999 | Spring, Jr. | 224/310 |

FOREIGN PATENT DOCUMENTS

| | | | |
|---|---|---|---|
| 2596344 | 10/1987 | France | 224/310 |
| 0101054 | 2/1984 | Germany | 224/310 |

*Primary Examiner*—Gregory M. Vidovich
*Assistant Examiner*—Maerena N. Brevard
*Attorney, Agent, or Firm*—Ronald E. Smith; Smith & Hopen, P.A.

[57] ABSTRACT

A side-loading and discharging rack for use with vehicles includes a base that is permanently secured to a conventional luggage rack. A pivot interface member is pivotally secured to an outboard end of the base, a transversely disposed elongate slide member is slideably engaged by the pivot interface member, and a handle is attached to the outboard end of the elongate slide member. The elongate slide member has a storage position where its inboard end is retained by a bracket mounted on an inboard end of the base. When in the storage position, a first bias member urges the elongate slide member to slide in an inboard-to-outboard direction, but that sliding motion is prevented by a lock member having an outboard end that abuts against an inboard end of a stop member. A second bias member urges the stop member into blocking relation to the lock member when the elongate slide member is in its storage position. Lifting the handle overcomes the bias so that the stop member is displaced out of the path of travel of the lock member to permit inboard-to-outboard sliding of the elongate slide member. Pivotal movement of the pivot interface member and the elongate slide member, coupled with sliding movement of the elongate slide member, provides a mechanical advantage facilitating deployment of the elongate slide member where it overlies a side wall of the vehicle and facilitating its return to its storage position.

7 Claims, 4 Drawing Sheets

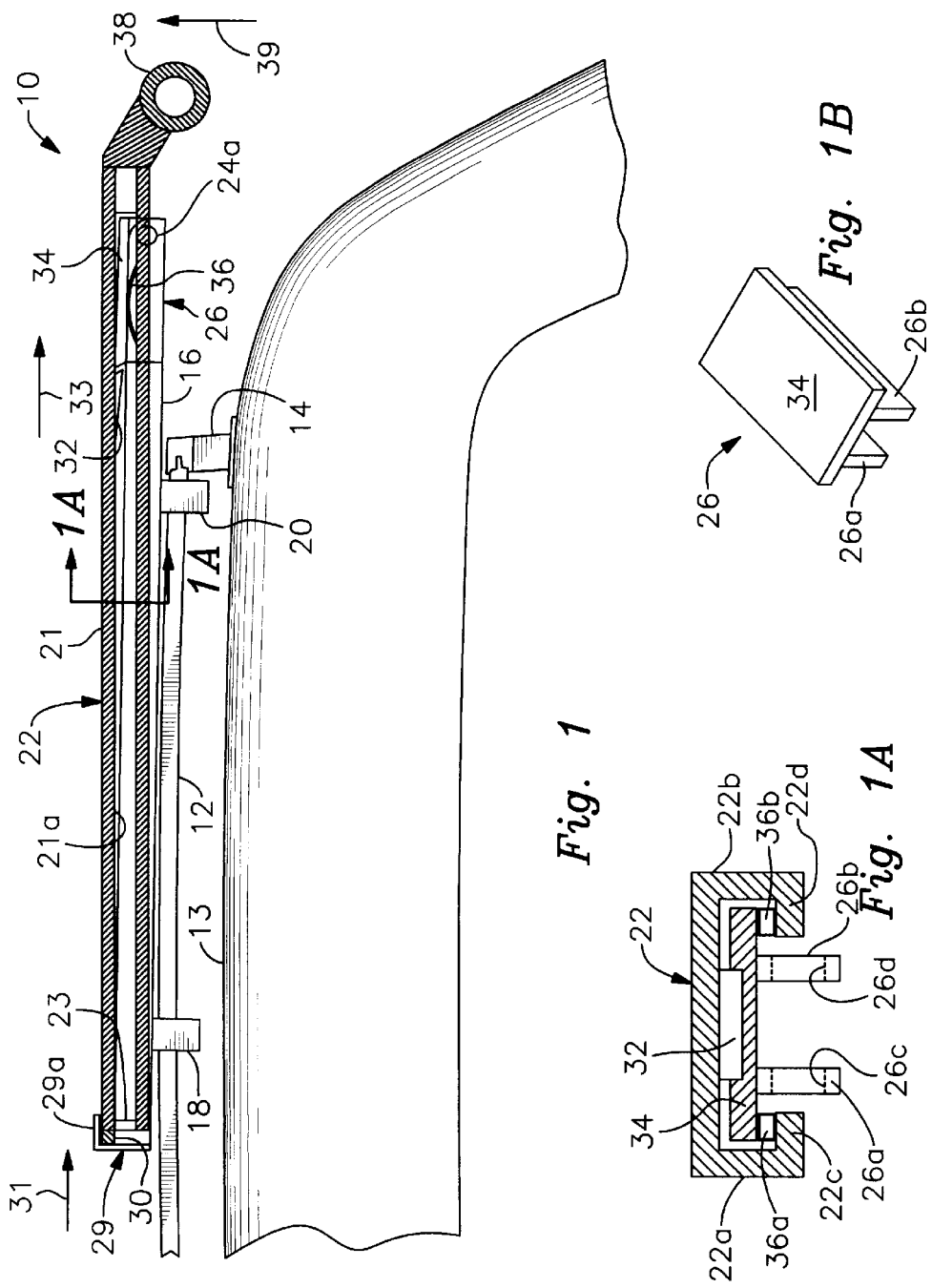

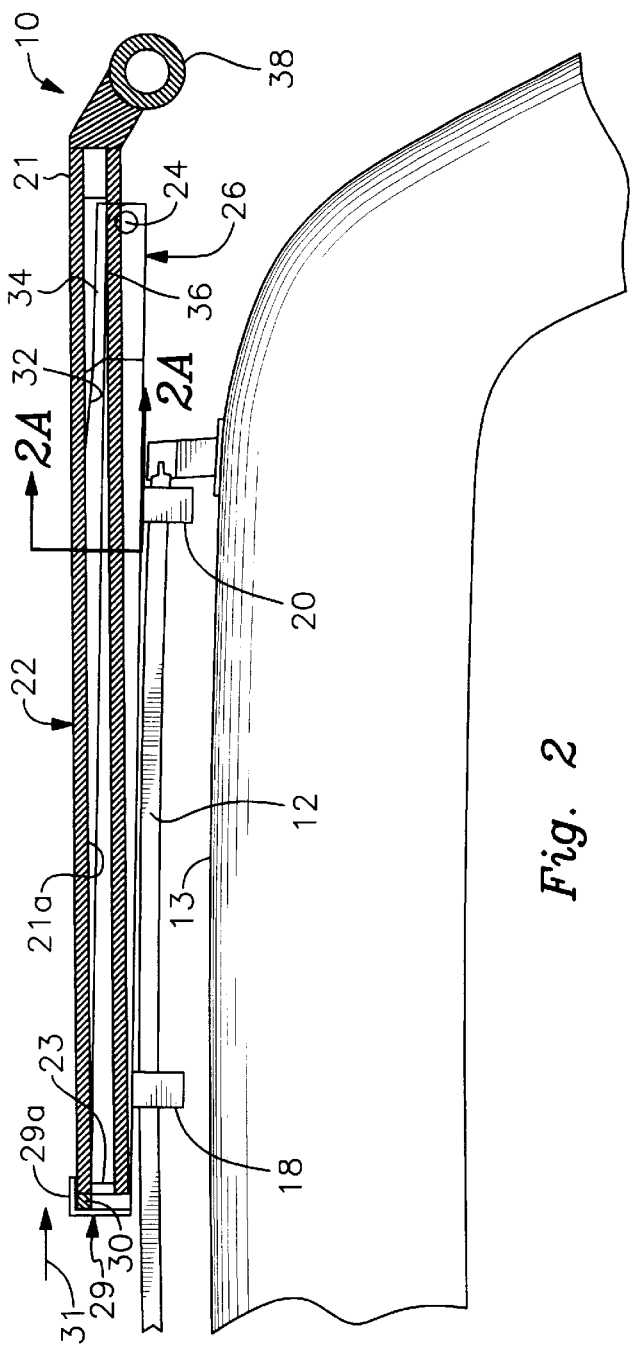
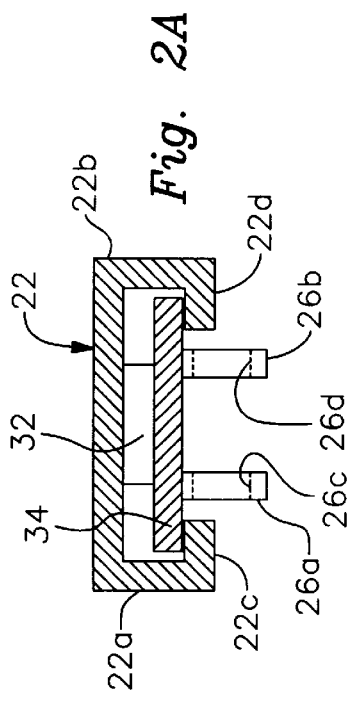

SIDE-LOADING AND DISCHARGING RACK FOR VEHICLES

BACKGROUND OF THE INVENTION

1. Field of the Invention

This invention relates, generally, to devices having utility for storing various articles atop the roof of a vehicle. More particularly, it relates to a storage apparatus that is easily repositionable from a vehicle top to a vehicle side and vice versa to facilitate loading and unloading of miscellaneous items.

2. Description of the Prior Art

Several storage racks have been developed that are capable of being repositioned from a vehicle top to a vehicle side and back to the vehicle top. For example, U.S. Pat. No. 3,193,124 to Essling discloses a side-loading and discharging storage rack. The contribution to the art disclosed in that patent includes a drawer-like mechanism for facilitating side-loading and discharging.

Although the art is quite well-developed, there remains a need for a side-loading and discharging rack having an elegant design that requires only a minimum number of parts and which is accordingly light-in-weight and economical to manufacture. The ideal device would be mountable to an existing luggage rack and would safely lock into place when the vehicle to which it is mounted is in motion. Moreover, it should be operable with minimum force so that individuals lacking great upper body strength could still manipulate it without difficulty or strain.

However, in view of the art considered as a whole at the time the present invention was made, it was not obvious to those of ordinary skill in this art how the needed improvements could be provided.

SUMMARY OF THE INVENTION

The long-standing but heretofore unfulfilled need for an apparatus that overcomes the limitations ot the prior art is now met by a new, useful, and nonobvious invention. The present invention includes a side-loading and discharging apparatus for use with vehicles of the type having a top-mounted storage rack. It includes a plurality of parallel, transversely-disposed, longitudinally spaced apart base members adapted for substantially permanent attachment to a storage rack that is mounted to the roof of a vehicle. The base members have a fixed position relative to the storage rack to which they are adapted to be mounted so that the base members do not move relative to the storage rack when the novel apparatus is in use.

The base members have an outboard end positioned near a side wall of the vehicle and an inboard end positioned near a longitudinal axis of symmetry of the vehicle. A pivot interface member is pivotally attached to each base member at the outboard end thereof and a transversely-disposed elongate slide member is slideably attached to each pivot interface member. A longitudinally-extending handle member is secured to respective outboard ends of the elongate slide members to facilitate manipulation of the novel apparatus by an individual standing beside the vehicle.

A retainer means is secured to an inboard end of each base member. The retainer means engages an inboard end of each elongate slide member when the elongate slide member is in a stored configuration and prevents pivotal movement of the elongate slide member when the inboard end of the elongate slide member is engaged by the retainer means.

A stop means prevents sliding movement of each elongate slide member in an inboard-to-outboard direction when the inboard end of the elongate slide member is engaged by the retainer means. The stop means is collectively formed by a wedge-shaped lock member carried by each elongate slide member and a stop member that is provided in the form of a flat top wall that forms a part of the pivot interface member. A bias means supported by flanges at a lower end of each elongate slide member urges its associated pivot interface member upwardly when the bias means is in repose, aligning the lock member and the stop member to prevent inboard-to-outboard travel of each slide member. Lifting the handle of the apparatus compresses the bias means so that the stop member is displaced away from the top wall of its associated elongate slide member, and the lock member passes through said space when the elongate slide members are displaced by the user in an inboard-to-outboard direction. A barrier means positioned at the inboard end of each elongate slide member prevents its separation from its associated pivot interface member when the novel apparatus is fully deployed into its loading/discharging configuration. A featheredge at the inboard side of each lock member enables it to slide over its associated stop member, momentarily depressing the bias means, when the apparatus is returned to its stored configuration.

Accordingly, a mechanical advantage is supplied by the pivotal and slideable connection between the elongate slide members and the base members that is provided by the pivot interface members so that a relatively low amount of force is exerted against the handle to deploy the apparatus and to return the apparatus to its stored configuration.

It is a primary object of this invention to advance the art of side-loading and discharging storage racks of the type mounted on vehicle tops by providing a rack of elegant, light-in-weight design.

Another object is to provide a side-loading and discharging storage rack that uses mechanical advantages to reduce the amount of force required to deploy and store the rack.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a front elevational, partially sectional view of an illustrative embodiment of the invention when in its stored and locked configuration;

FIG. 1A is a sectional view taken along line 1A—1A in FIG. 1;

FIG. 1B is a perspective view of a novel pivot interface member;

FIG. 2 is a front elevational, partially sectional view of the apparatus depicted in FIG. 1 after said apparatus has been displaced in the direction indicated by the upwardly-pointing directional arrow in FIG. 1;

FIG. 2A is a sectional view taken along line 2A—2A in FIG. 2;

DETAILED DESCRIPTION OF THE PREFERRED EMBODIMENT

Figure 3:
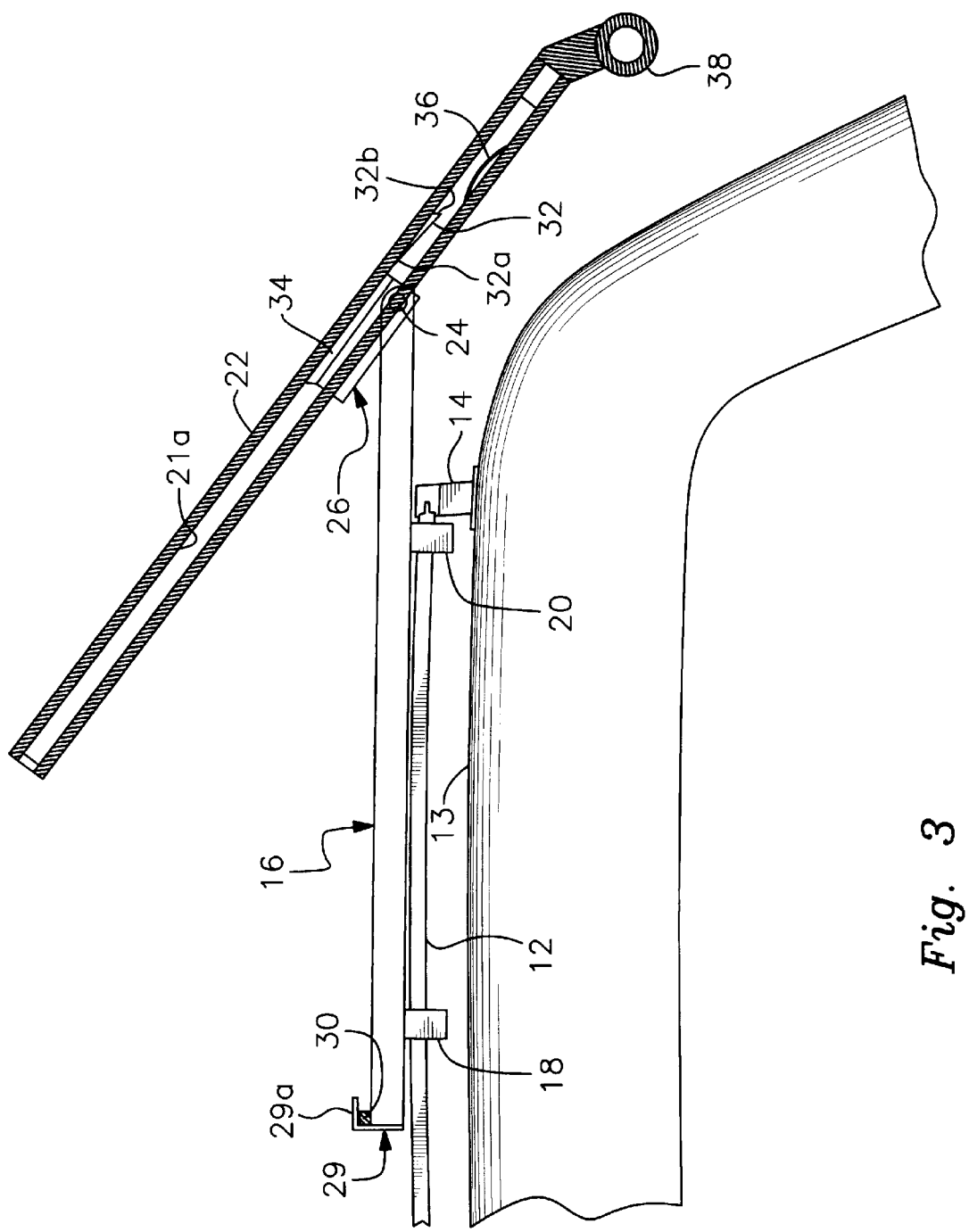
FIG. 3 is a front elevational, partially sectional view of the FIG. 1 apparatus when it is about half way between its stored configuration and its fully deployed configuration.

Referring now to FIG. 1, it will there be seen that an exemplary embodiment of the invention is denoted as a whole by the reference numeral 10.

Side-loading and discharging assembly 10 is mounted on a conventional luggage rack having a plurality of transversely disposed, longitudinally spaced apart rack members 12, only one of which is depicted; such luggage rack forms no part of the invention, per se. Each rack member 12 is spaced apart from vehicle roof 13 by upstanding posts 14 at its opposite ends, only one of which is shown.

The novel assembly includes a plurality of parallel, transversely disposed, longitudinally spaced apart elongate base members 16, perhaps best illustrated in FIG. 3, that are mounted to rack members 12 through mounting blocks 18, 20. Since this disclosure is provided in front or rear elevational views, only one of said base members 16 is depicted.

Mounting block 18 is hereby defined as being inboard relative to mounting block 20, which latter mounting block is positioned near the side wall of the vehicle and which is therefor defined as the outboard mounting block. The inboard end of any part described herein is the end nearest a longitudinal axis of symmetry of the vehicle upon which the novel assembly is mounted, and the outboard end of any part is the end thereof nearest the side wall of the vehicle.

Mounting blocks 18 and 20 are secured to said rack members 12 by any suitable means and each base member 16 is then secured to said mounting blocks by any suitable means. Significantly, each base member 16 cannot move, i.e., it has a fixed position like the conventional luggage rack as a whole.

As best understood by comparing FIGS. 1–4 with one another, an elongate slide member 22 is indirectly pivotally connected to each base member 16 at pivot point 24 by a pivot pin 24a. More particularly, each pivot interface member 26, having a truncate extent relative to its associated elongate slide member 22, is directly pivotally connected to its associated base member 16 at pivot point 24 and each elongate slide member 22 is slideably connected to its associated pivot interface member 26.

Again, it should be understood that FIGS. 1–4 are frontal or rear elevational views of the novel assembly, and that there are two or more rack members 12 that collectively form a conventional luggage rack, two or more base members 16, and two or more elongate slide members 22, all of which are transversely disposed relative to a longitudinal axis of the vehicle, parallel to one another and longitudinally spaced apart from one another to form the novel assembly. Moreover, there is a pivot interface member 26 associated with each elongate slide member 22.

It should also be understood that an item or items to be transported by the novel assembly are strapped or otherwise releasably attached to elongate slide members 22 by any suitable means.

As best understood in connection with FIG. 1A, each elongate slide member 22 has a pair of side walls 22a, 22b depending from its opposite sides and inwardly turned, confronting flanges 22c, 22d are respectively formed in the lowermost ends of said side walls. Pivot interface member bias members 36a, 36b are respectively supported by said confronting flanges.

As best understood in connection with FIG. 1B, each pivot interface member 26 includes a flat top wall 34 supported by a pair of side walls 26a, 26b which depend therefrom, in recessed, offset relation to the opposite sides thereof. Pivot pin 24a, which provides pivotal connection between each base member 16 and its associated pivotal interface member 26 as mentioned earlier, extends through a pair of aligned apertures 26c, 26d formed in each side wall 26a, 26b. Flat top wall 34 is called stop member 34 to suggest its function.

Stop member 34 slidingly engages interior surface 21a of top wall 21 of elongate slide member 22 when the novel apparatus is being deployed or returned to its storage configuration.

When the novel assembly is in its stored configuration, as depicted in FIG. 1, an inverted "L"-shaped bracket or retainer means 29, which is fixedly secured to the inboard end of base 16, holds down the leading or inboard end of elongate slide member 22. Retainer bias means 30, which may take the form of a compressible pad, a spring, or other known bias means, is secured to said retainer means below a horizontal arm 29a thereof as depicted. Said retainer bias means 30 urges elongate slide member 22 in the direction indicated by directional arrow 31 at the left side of FIG. 1, i.e., in an inboard-to-outboard direction.

Wedge-shaped lock member 32 is fixedly secured to underside 21a of top wall 21 of slide member 22 at a preselected position. The leading or inboard end of lock member 32 has a feather edge 32a (FIGS. 3 and 4) and the trailing or outboard end of said lock member defines a longitudinally-extending shoulder 32b (FIGS. 3 and 4) that abuts a longitudinally-extending shoulder at the inboard end of stop member 34 when said bias members 36a, 36b are in repose.

Accordingly, as made clear in FIG. 1, when novel assembly 10 is in its fully stored configuration, the inboard end of elongate slide member 22 is positioned under arm 29a of retainer means 29 and retainer bias means 30 urges shoulder 32b of wedge-shaped lock member 32 to bear against the inboard edge or shoulder of stop member 34. This prevents sliding displacement of elongate slide member 22 in the direction indicated by directional arrow 33 in FIG. 1, i.e., in an inboard-to-outboard direction.

As drawn in FIG. 1, a small gap appears between shoulder 32b and said inboard edge of stop member 34 just to indicate that said parts are separate members, but it should be understood that no such gap exists when retainer bias means 30 is performing its function and when bias members 36a, 36b are in repose.

To enable deployment of elongate slide member 22 into its FIG. 3 position, it is necessary to move stop member 34 away from wedge-shaped lock member 32 so that said lock member and elongate slide member 22 to which it is connected may slide past said stop member. This is accomplished by momentarily depressing bias members 36a, 36b which may take the form of a leaf spring, a compressible foam pad, or other form of bias means. When in repose as depicted in FIG. 1, said bias members 36a, 36b urge stop member 34 into abutting engagement with underside 21a of top wall 21 of elongate slide member 22, thereby preventing inboard-to-outboard travel of said elongate slide member because wedge-shaped lock member 32, which is secured to said underside 21a, cannot move past said stop member 34.

Figure 4:
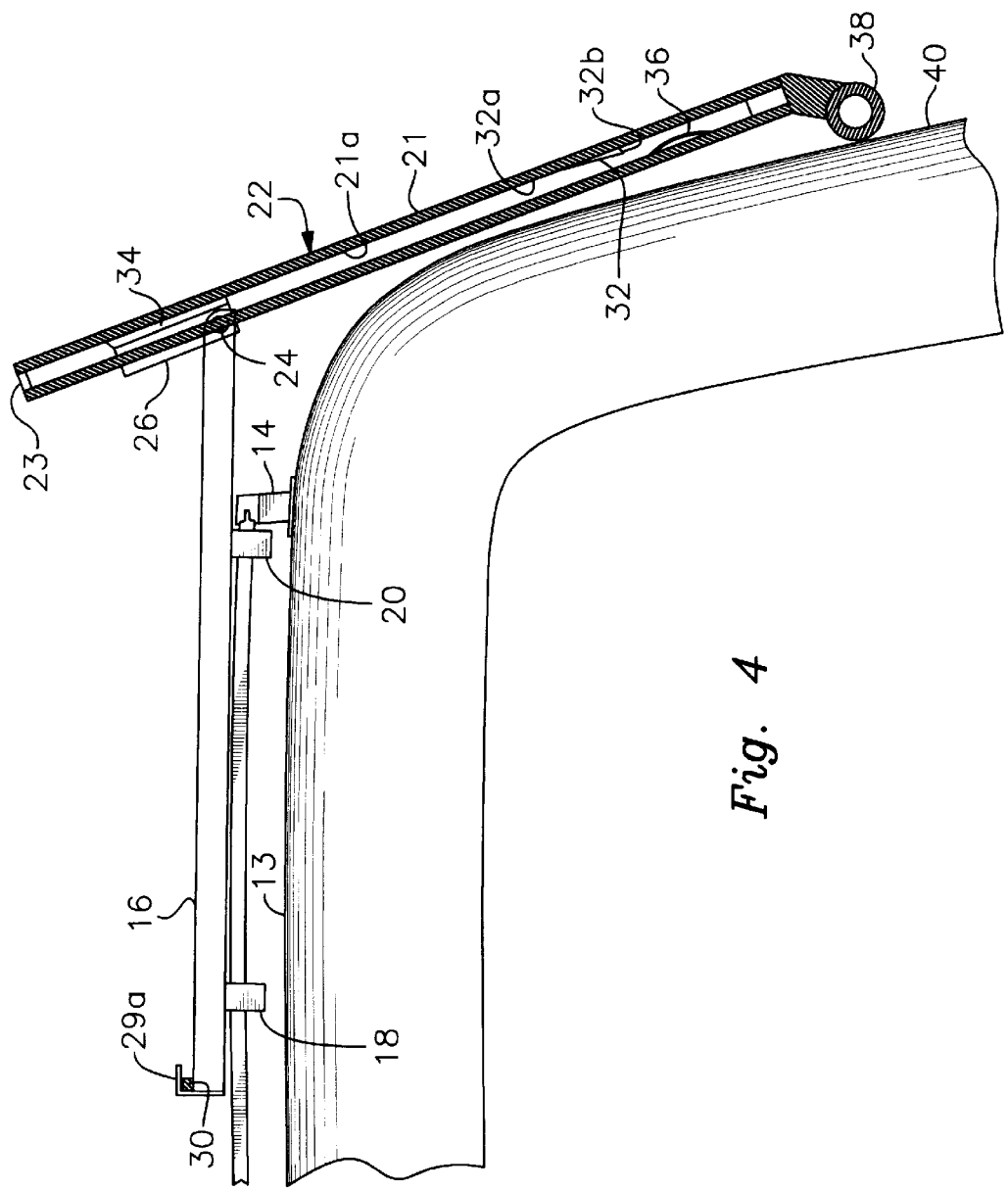
FIG. 4 is a front elevational, partially sectional view of the apparatus when almost in its fully rotated or deployed configuration.

Longitudinally-extending handle 38, which is advantageously positioned near the side of the vehicle so that it can be reached easily, is lifted as indicated by directional arrow 39 in FIG. 1 until it reaches the position depicted in FIG. 2. As indicated in FIGS. 2 and 2A, such lifting displaces top wall 21 of elongate slide member 22 upwardly and thus depresses bias members 36a, 36b so that stop member 34 misaligns with wedge-shaped lock member 32. Said wedge-shaped lock member 32 slides over stop member 34 as handle 38 is sequentially displaced into its FIG. 3 and FIG. 4 positions. As seen in FIGS. 3 and 4, top wall 21 of elongate slide member 22 and said stop member 34 regain sliding contact with one another after wedge-shaped lock member 32 clears stop member 34.

FIG. 4 depicts handle 38 resting against side 40 of a vehicle, but this is not the fully-deployed configuration of the novel assembly. When fully deployed, barrier member 23, which is secured to the inboard end of elongate slide member 22 as indicated in FIGS. 1, 2 and 4, abuts stop member 34 and prevents sliding disengagement of elongate slide member 22 from pivot interface member 26.

Ladders, skis, or many other devices, items of equipment, or the like may be attached to or detached from the novel structure by many suitable means when the novel apparatus is fully deployed.

It should be apparent that the apparatus is easily restored to its FIG. 1 position from its FIG. 4 position. When the leading (inboard) end of elongate slide member 22 is displaced toward retainer means 29, pivot interface bias members 36a, 36b are compressed as wedge-shaped lock member 32 slides over stop member 34 and said bias means is rapidly uncompressed as shoulder 32b clears the inboard end of stop member 34 and drops into its FIG. 1 position on the inboard side of said stop member 34. The inboard end of elongate slide member 22 is substantially simultaneously directed into underlying relation to horizontal arm 29a of retainer means 29, thereby depressing retainer bias means 30 and thereby urging shoulder 32b of said wedgeshaped lock member 32 into abutting relation to the inboard edge of said stop member 34, locking said apparatus into its stored configuration.

Due to the mechanical advantage inherent in the pivotal motion of elongate slide member 22 about pivot point 24 and in the sliding motion of each elongate slide member relative to its associated pivot interface member 26, which slide motion occurs simultaneously with the pivoting motion, the amount of force required to deploy or store the novel apparatus is nominal, even when apparatus 10 is carrying relatively heavy loads.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A side-loading and discharging apparatus for use with vehicles of the type having top-mounted storage racks, comprising:

a plurality of parallel, transversely-disposed, longitudinally spaced-apart base members adapted for substantially permanent attachment to a storage rack that is mounted to the roof of a vehicle;

each base member having a fixed position relative to the storage rack to which it is adapted to be mounted so that each base member does not move relative to said storage rack when said apparatus is in use;

each base member having an outboard end positioned near a side wall of said vehicle and an inboard end positioned near a longitudinal axis of symmetry of said vehicle;

a pivot interface member that is pivotally attached to each said base member at said outboard end thereof;

each pivot interface member including a flat top wall and a pair of side walls that depend from said flat top wall and said side walls being apertured to receive therethrough a pivot pin means that provides said pivotal connection between each said pivot interface member and its associated said base member;

a transversely-disposed elongate slide member that is slideably attached to its associated said pivot interface meter;

each said elongate slide member including a top wall, a side wall depending from opposite sides of said top wall, and a pair of inwardly turned, confronting flanges formed in respective lowermost ends of said side walls;

a lock member fixedly secured to an underside of said top wall of said elongate slide member;

a stop member formed by said flat top wall of said pivot interface member;

a bias means supported by said confronting flanges of said elongate slide member that urges said stop member into movement-blocking relation to said lock member when said bias means is in repose; and a longitudinally-extending handle member secured to an outboard end of each said elongate slide member to facilitate manipulation of said elongate slide members by an individual finding beside said vehicle;

whereby a mechanical advantage is supplied by the pivotal and slideable connection between each said elongate slide member and each said base member that is provided by said pivot interface members so that a relatively low amount of force is exerted against said handle to deploy said apparatus into a loading and discharging position and to return said apparatus to a stored configuration.

2. The apparatus of claim 1, further comprising:

a retainer means secured to an inboard end of each said base member;

said retainer means engaging an inboard end of each said elongate slide member when each said elongate slide member is in the stored configuration and preventing pivotal movement of each said elongate slide member when said inboard end of each said elongate slide member is engaged by said retainer means.

3. The apparatus of claim 2, wherein said lock member is wedge-shaped and has a feather edge formed in an inboard end thereof and a longitudinally-extending shoulder formed on an outboard end thereof;

wherein said stop member has a longitudinally-extending shoulder formed in an inboard end thereof;

said longitudinally-extending shoulder formed on the inboard end of said stop member abutting said longditudinally-extending shoulder formed on the outboard end of said wedge-shaped lock member and preventing sliding movement of said elongate slide member in an inboard-to-outboard direction when said pivot interface bias means is in said position of repose.

4. The apparatus of claim 3, further comprising a retainer bias means positioned at said inboard end of said elongate slide member, said retainer bias means being secured to said retainer means and urging said elongate slide member away from said retainer means, in an inboard-to-outboard direction, when said elongate slide member is in the stored configuration, said urging causing said longitudinally-extending shoulder formed on said outboard end of said wedge-shaped lock member to abut against said longitudinally-extending shoulder formed on said inboard end of said stop member.

5. The apparatus of claim 4, wherein said retainer means is an inverted "L"-shaped bracket.

6. The apparatus of claim 3, wherein each said pivot interface member has a truncate extent relative to the elongate extent of each said elongate slide member.

7. The apparatus of claim 2, further comprising a barrier member secured to said inboard end of each said elongate slide member to prevent sliding disengagement of each said elongate slide member from a associated said pivot interface member when the apparatus is in its fully deployed configuration.

* * * * *